United States Patent
Yang

(10) Patent No.: US 7,402,244 B2
(45) Date of Patent: Jul. 22, 2008

(54) PORTABLE WATER FILTERING ASSEMBLY

(76) Inventor: Chih-Sheng Yang, No. 11, Lane 151, Long Tan Street, Long Tan Village, Yong Kang City, Tainan County 710 (TW)

( * ) Notice: Subject to any disclaimer, the term of this patent is extended or adjusted under 35 U.S.C. 154(b) by 225 days.

(21) Appl. No.: 11/448,096

(22) Filed: Jun. 7, 2006

(65) Prior Publication Data

US 2007/0284295 A1      Dec. 13, 2007

(51) Int. Cl.
  *C02F 9/00* (2006.01)
  *B01D 27/08* (2006.01)
  *B01D 35/00* (2006.01)
  *B01D 25/02* (2006.01)
(52) U.S. Cl. .................. 210/232; 210/238; 210/282
(58) Field of Classification Search .............. 210/232, 210/238, 282
  See application file for complete search history.

(56) References Cited

U.S. PATENT DOCUMENTS

| 1,860,849 | A | * | 5/1932 | Burch | 210/237 |
|---|---|---|---|---|---|
| 3,342,340 | A | * | 9/1967 | Shindell | 210/282 |
| 3,498,457 | A | * | 3/1970 | Gough | 210/85 |
| 4,196,081 | A | * | 4/1980 | Pavia | 210/94 |
| 5,004,535 | A | * | 4/1991 | Bosko et al. | 210/90 |
| 5,130,020 | A | * | 7/1992 | Meckstroth | 210/264 |

* cited by examiner

*Primary Examiner*—Thomas M Lithgow
(74) *Attorney, Agent, or Firm*—Rosenberg, Klein & Lee

(57) ABSTRACT

A portable water filtering assembly includes a soft bag which is composed of a first part and a second part. At least one holding member is connected to an inside of at least one of the first and second parts so as to hold a water filtering device. The water filtering device is connected with an inlet tube and an outlet tube. Two pouches are respectively connected with the first and second parts so as to receive the inlet tube and the outlet tube. Each of the first and second parts has an opening in a side thereof and the opening communicates with the pouch corresponding thereto. A door pivotably closes the opening and the inlet and outlet tubes can extend from the openings when in use.

9 Claims, 7 Drawing Sheets

PORTABLE WATER FILTERING ASSEMBLY

FIELD OF THE INVENTION

The present invention relates to a portable water filtering assembly with soft bag in which filtering devices are received and an inlet tube and an outlet tube extend from a side of the bag.

BACKGROUND OF THE INVENTION

A conventional portable water filtering assembly is shown in FIG. 1 and generally includes a case 1 which is made by stiff material and an electric box 11 is connected on a top of the case 1. A handle is connected to the electric box 11 so that the user can carry the case 1. Two filtering devices 12 are positioned in the case 1 and a door is pivotably connected to the case. An outlet tube extends from a lower end of one of the two filtering devices 12 and can be accessed when the door is opened. However, the case 1 has a fixed shape and made by stiff material so that it occupies space and is not convenient to be stored.

The present invention intends to provide a portable water filtering assembly which includes a soft bag with a plurality of filtering devices received therein. The bag includes a handle for convenience of carry and the inlet tube and the outlet tube can extend from two sides of the bag.

SUMMARY OF THE INVENTION

The present invention relates to a portable water filtering assembly that comprises a bag made by soft material and the bag includes a first part and a second part which has one side pivotably connected to a side of the first part. A connection device such as a zipper is connected between the first and second parts so as to combine two respective peripheries of the first and second parts. At least one holding member is connected to an inside of at least one of the first and second parts so as to hole a water filtering device. The water filtering device is connected with an inlet tube and an outlet tube. Two pouches are respectively connected with the first and second parts so as to receive the inlet tube and the outlet tube.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
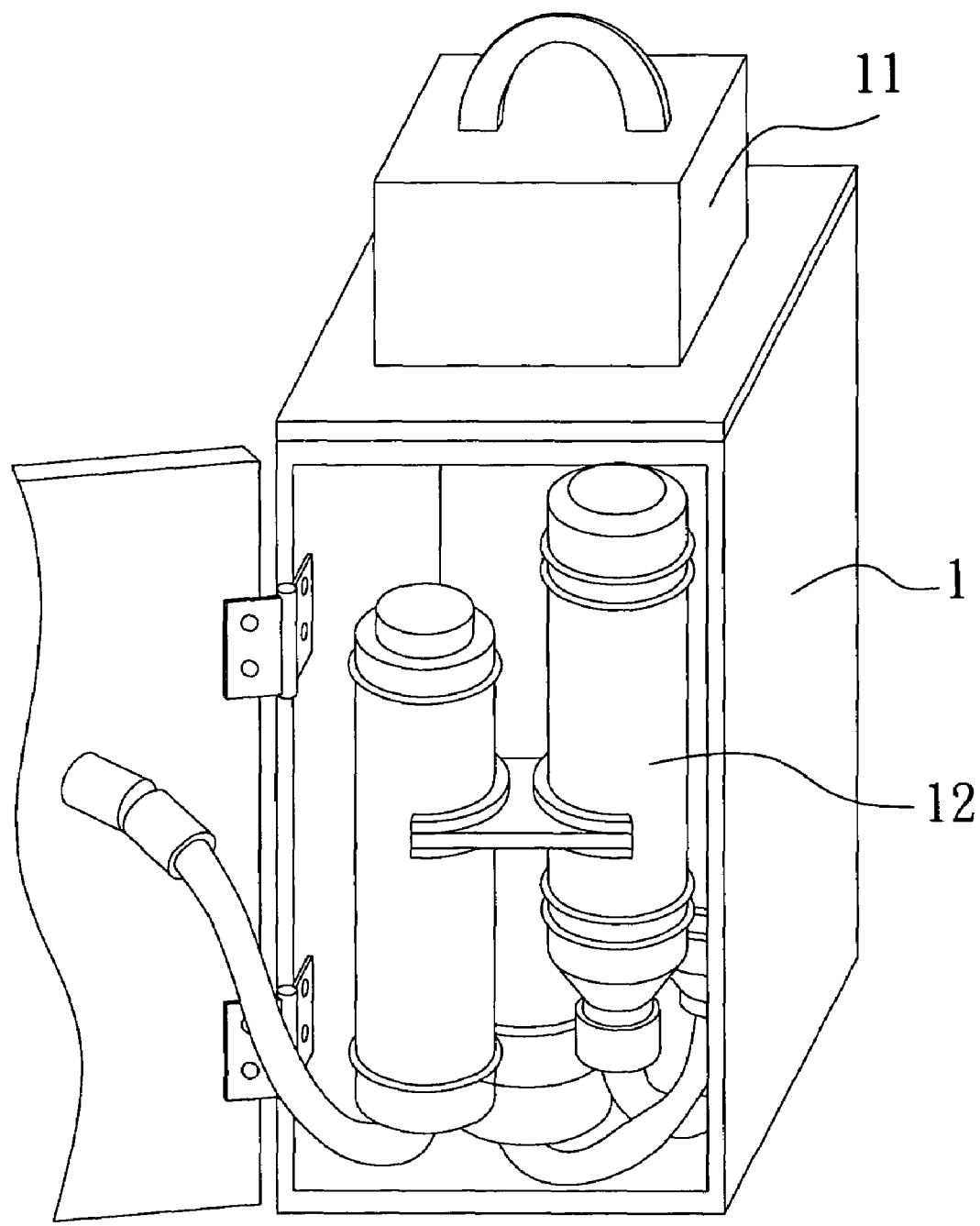
FIG. 1 is a perspective view to show a conventional portable water filtering assembly.
Figure 2:
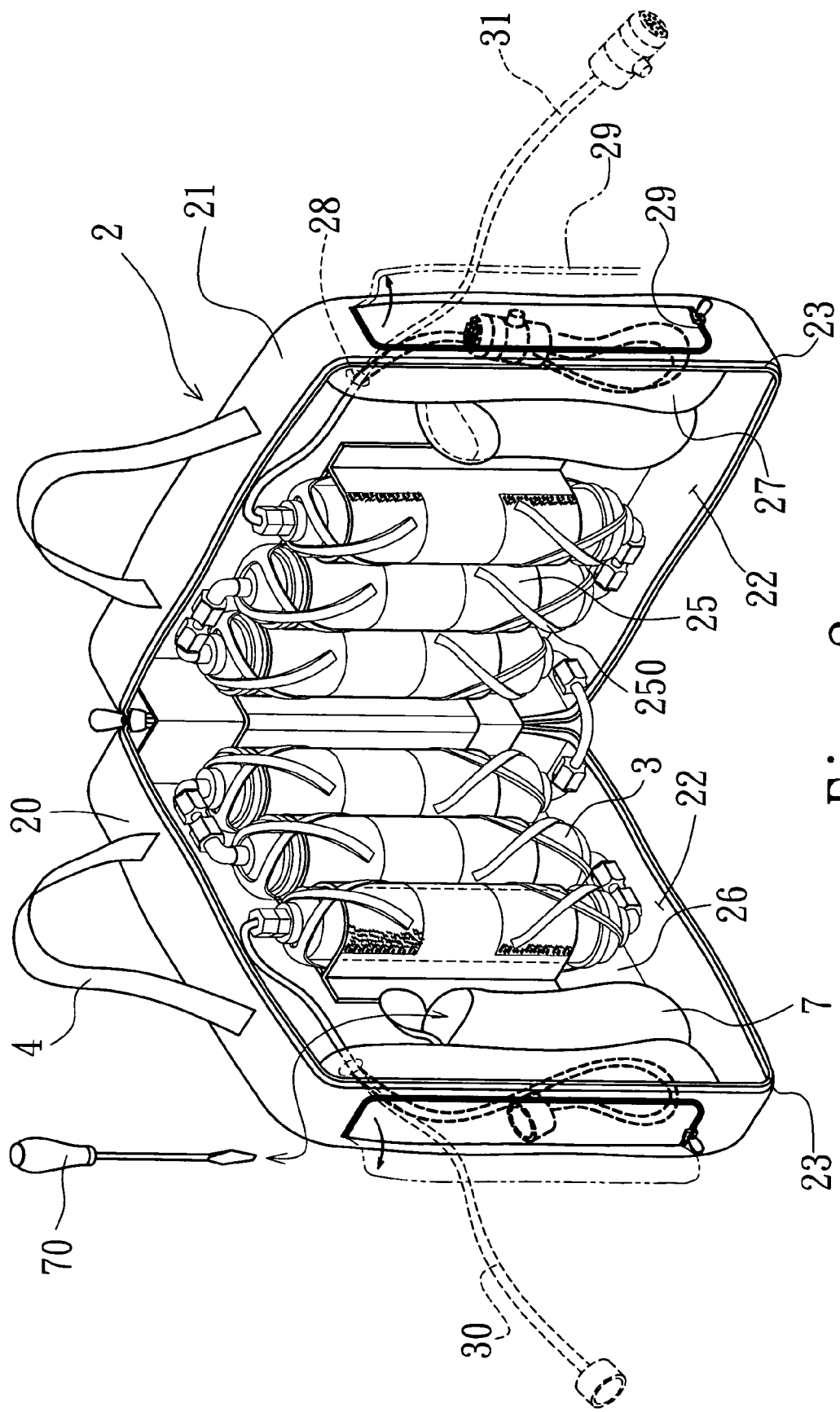
FIG. 2 is a perspective view to show the portable water filtering assembly of the present invention.
Figure 3:
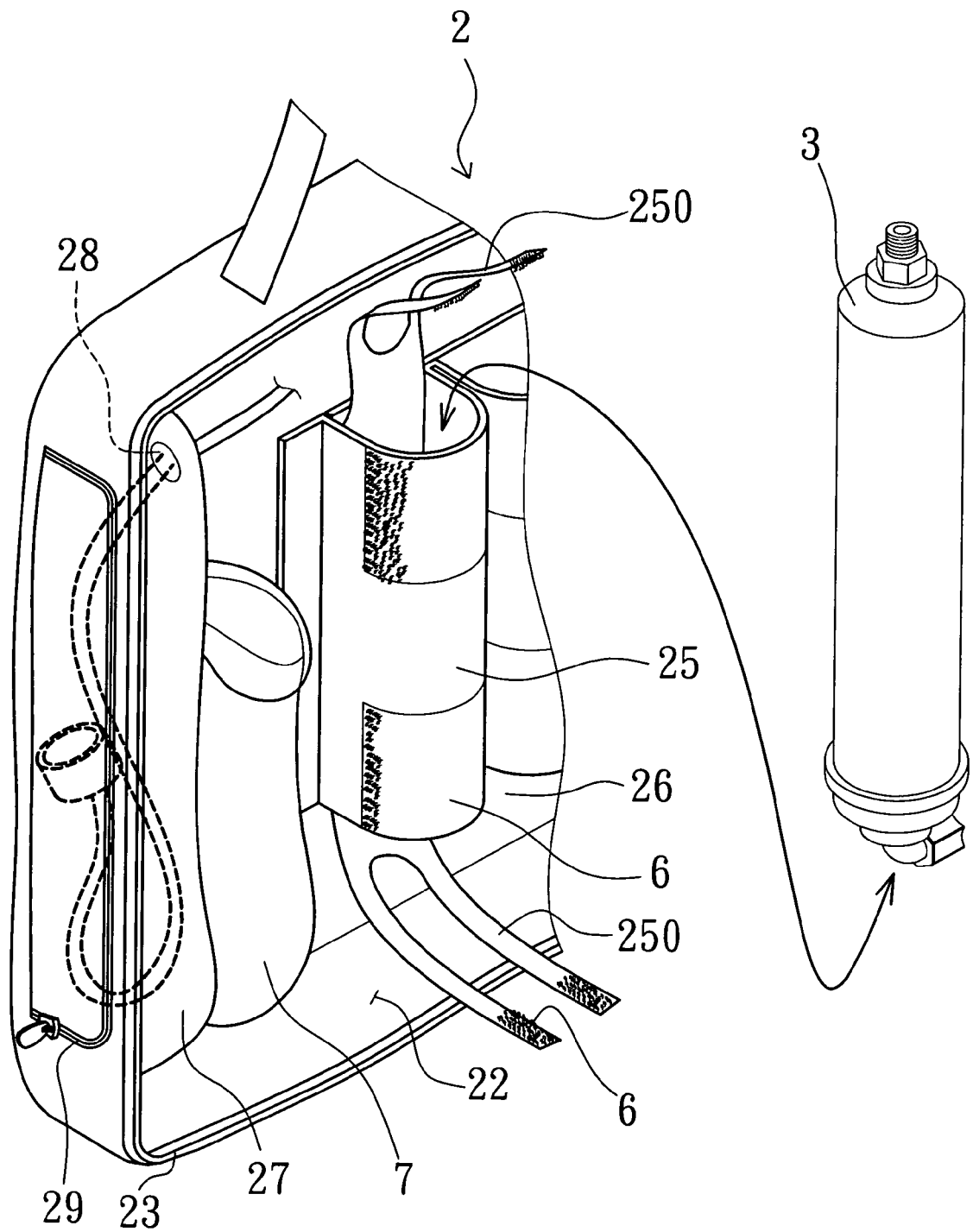
FIG. 3 is an exploded view to show a water filtering device and the holding member of the portable water filtering assembly of the present invention.
Figure 4:
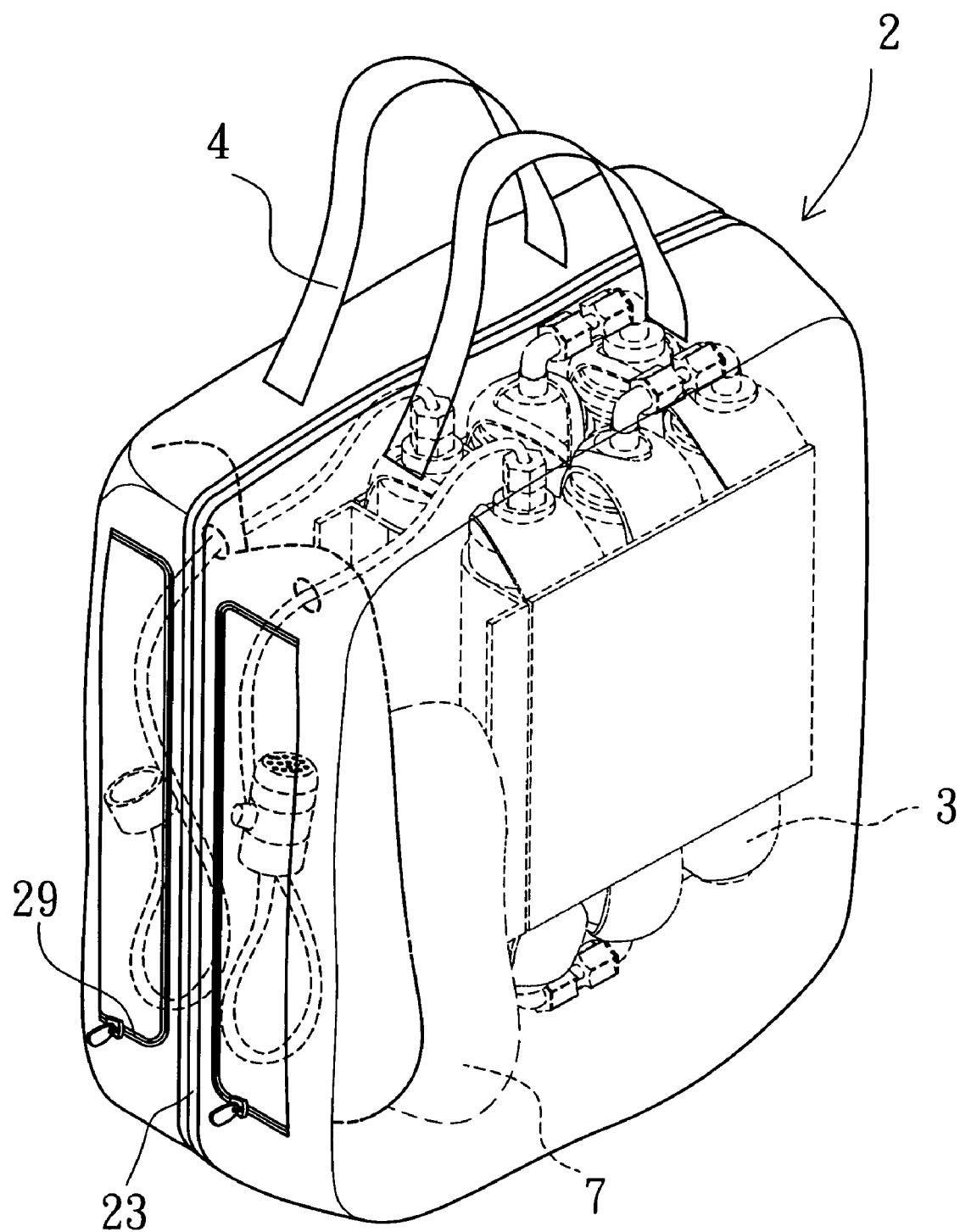
FIG. 4 shows that the bag of the portable water filtering assembly of the present invention is in closed status.

Referring to FIGS. 2 to 3, the portable water filtering assembly of the present invention comprises a bag 2 made by soft material and the bag 2 includes a first part 20 and a second part 21 which has one side pivotably connected to a side of the first part 20. A connection device 23 such as a zipper is connected between the first and second parts 20, 21 so as to combine two respective peripheries of the first and second parts 20, 21 to form a space 22 in the bag 2. A plurality of holding members 25 are connected to an inside 26 of each of the first and second parts 20, 21. The holding members 25 each are a tubular member as shown in FIG. 3 so that a water filtering device 3 is inserted in each tubular holding member 25 and held by a positioning device 250 of the holding member 25. The positioning device 250 includes an upper portion and a lower portion, each of the upper and lower portions has a hook-loop strip 6 connected thereto which is connected with another hook-loop strip on the holding member 25. The water filtering devices 3 each have two ends and hoses are connected to the ends of the water filtering device 3. An inlet tube 30 and an outlet tube 31 are respectively connected to the first water filtering device 3 and the second water filtering device 3. Two pouches 27 are respectively connected with the first and second parts 20, 21 so as to receive the inlet tube 30 and the outlet tube 31. The two pouches 27 each have a hole 28 and the inlet tube 30 and the outlet tube 31 respectively extend through the hole 28 corresponding thereto, A tool bag 7 is connected in each of the first and second parts 20, 21 so as to receive tools such as screwdrivers 70 in the pouches 27.

Figure 5:
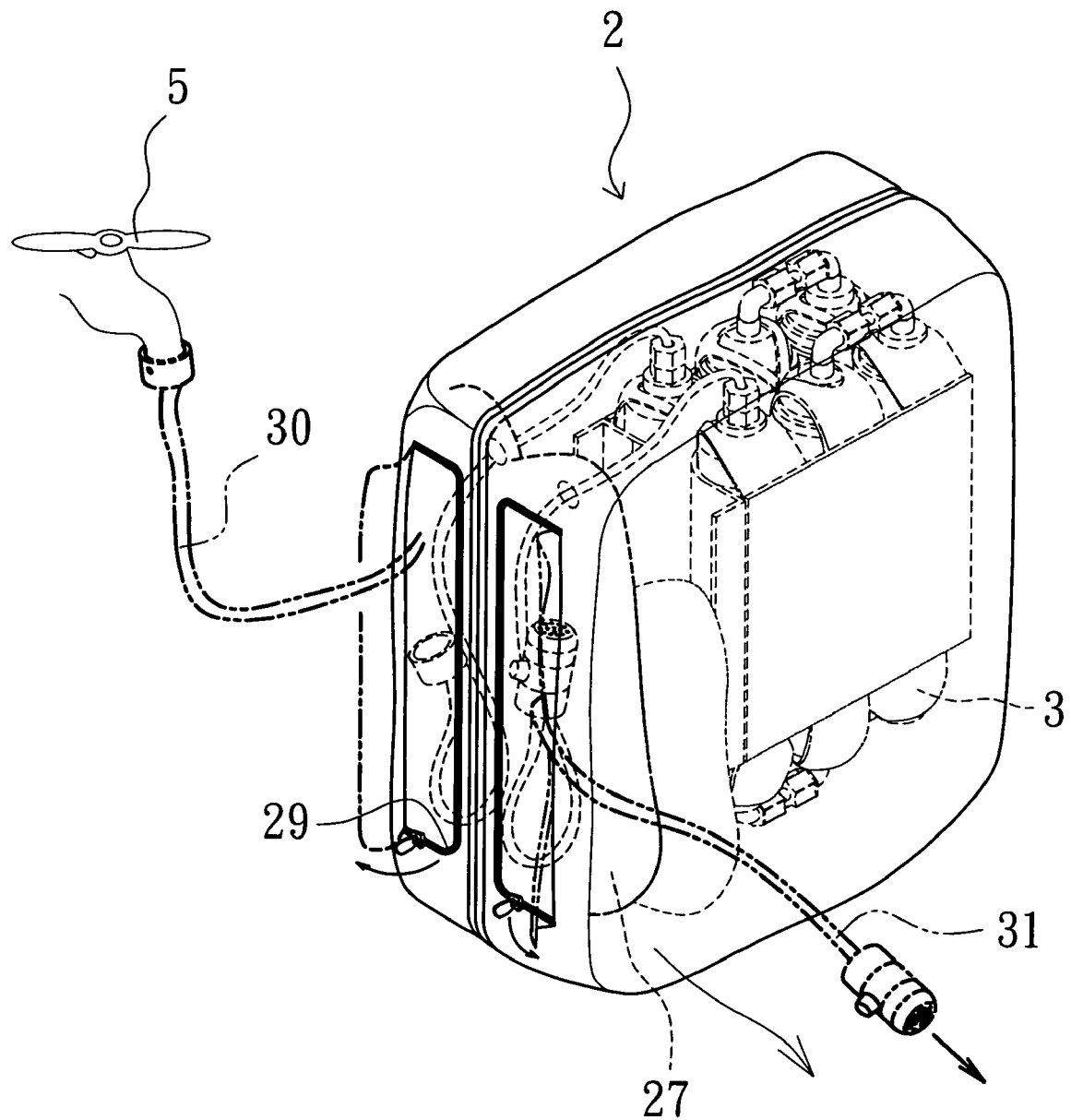
FIG. 5 shows that the inlet tube and the outlet tube extend from two openings of the bag of the present invention.

Each of the first and second parts 20, 21 has an opening defined in a side thereof and a door 29 is pivotably engaged with the opening, the two openings respectively communicate with the pouches 27. Each door 29 and each opening has a zipper device connected therebetween so that the doors 29 can be opened to allow the user to access the inlet tube 30 and the outlet tube 31. As shown in FIG. 5, the inlet tube 30 is connected with a faucet 5 to introduce water into the water filtering devices 3 and the water is filtered and flows out from the outlet tube 31.

Figure 6:
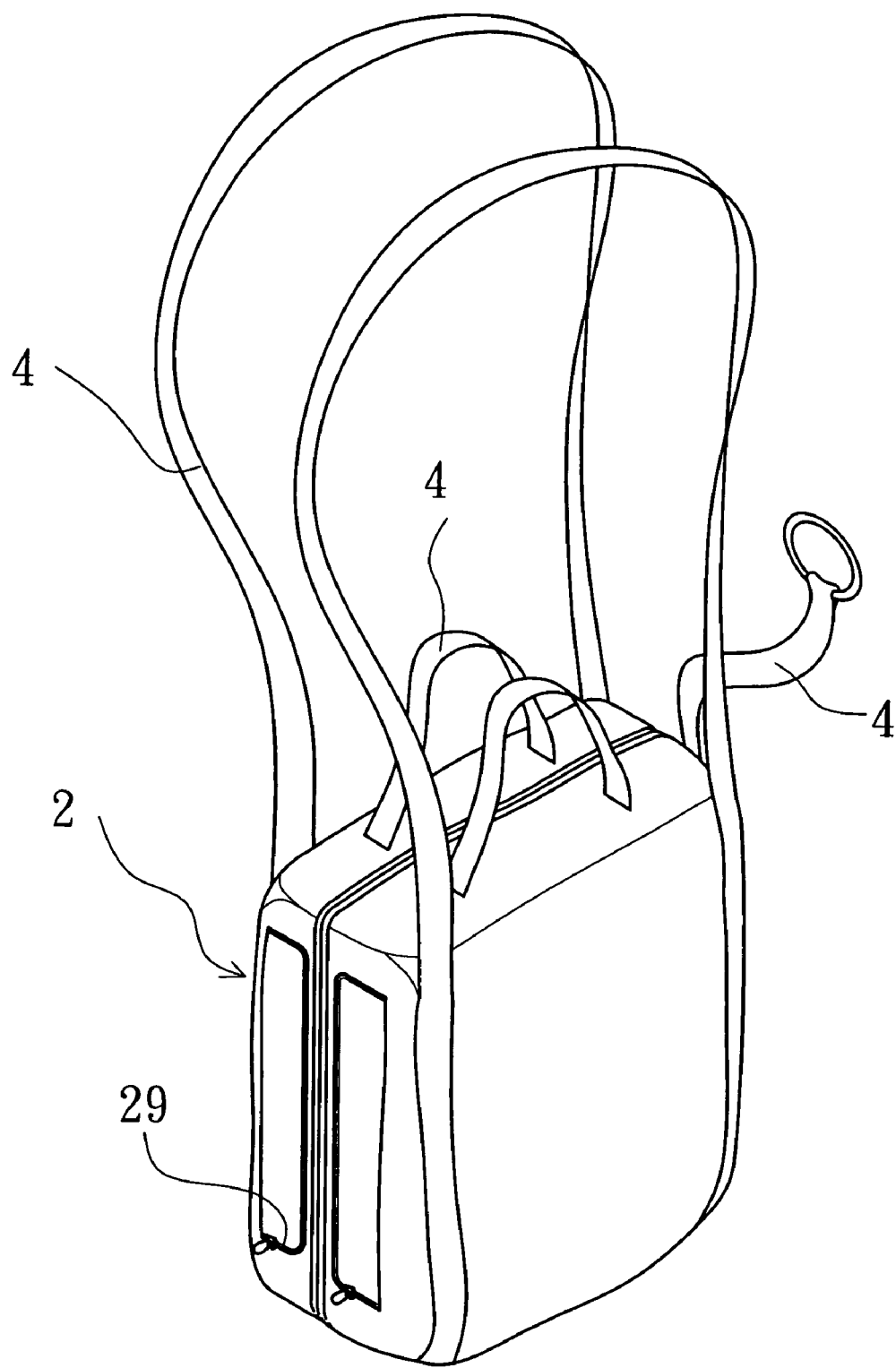
FIG. 6 shows several types of handles on the bag of the portable water filtering assembly of the present invention.
Figure 7:
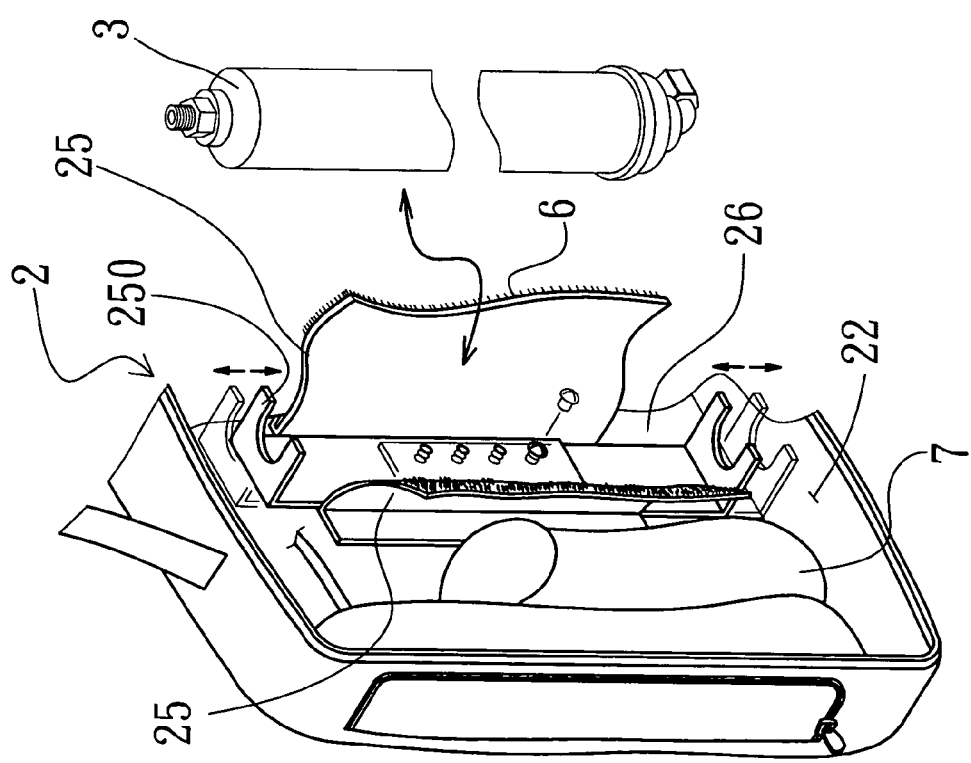
FIG. 7 shows another holding member and positioning device of the present invention.

Each of the first and second parts 20, 21 has a handle 4 connected to a top thereof so that the user can carry the bag 2 conveniently. As shown in FIG. 6, the bag 2 can also be equipped with different types of handles when needed.

Figure 8:
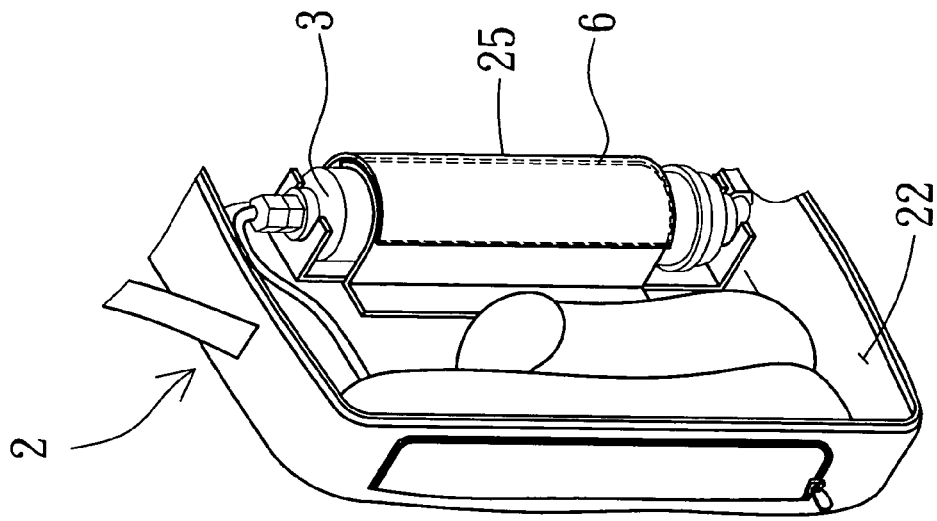
FIG. 8 shows the water filtering device is held in the holding member by the positioning device.

As shown in FIG. 8 which shows another embodiment of the holding member 25 and positioning device 250. The holding member 25 is composed of two L-shaped frames which are adjustably movable toward each other to hold the water filtering device 3. The positioning device 250 includes two side patches which are connected with each other by two respective hook-loop strips 6. The two L-shaped frames are able to hold the water filtering devices 3 of different sizes.

While we have shown and described the embodiment in accordance with the present invention, it should be clear to those skilled in the art that further embodiments may be made without departing from the scope of the present invention.

What is claimed is:

1. A portable water filtering assembly comprising:

a bag made by soft material and including a first part and a second part which has one side pivotably connected to a side of the first part, a connection device connected between the first and second parts so as to combine two respective peripheries of the first and second parts, at least one holding member connected to an inside of at least one of the first and second parts, a water filtering device being held by the at least one holding member, the water filtering device connected with an inlet tube and an outlet tube, two pouches respectively connected with the first and second parts so as to receive the inlet tube and the outlet tube.

2. The assembly as claimed in claim 1, wherein the two pouches each have a hole and the inlet tube and the outlet tube respectively extend through the hole corresponding thereto.

3. The assembly as claimed in claim 1, wherein each of the first and second parts has an opening defined in a side thereof and a door is pivotably engaged with the opening, the two openings respectively communicate with the pouches.

4. The assembly as claimed in claim 3, wherein each door and each opening has a zipper device connected therebetween.

5. The assembly as claimed in claim 1, wherein each of the first and second parts has a handle connected to a top thereof.

6. The assembly as claimed in claim 1, wherein the at least one holding member has a positioning device connected thereto.

7. The assembly as claimed in claim 6, wherein the at least one holding member is a tubular member, the positioning device includes an upper portion and a lower portion, each of the upper and lower portions has a hook-loop strip connected thereto which is connected with another hook-loop strip on the holding member.

8. The assembly as claimed in claim 6, wherein the at least one holding member is composed of two L-shaped frames which are adjustably movable toward each other to hold the water filtering device, the positioning device includes two side patches which are connected with each other by two respective hook-loop strips.

9. The assembly as claimed in claim 1, wherein a tool bag is connected in at least one of the first and second parts.

\* \* \* \* \*